(12) United States Patent
Shimada et al.

(10) Patent No.: US 7,147,690 B2
(45) Date of Patent: Dec. 12, 2006

(54) METHOD FOR REPLENISHING HYDROGEN TO COMPRESSED HYDROGEN TANK AND HYDROGEN REPLENISHING DEVICE

(75) Inventors: Toshiaki Shimada, Utsunomiya (JP); Yoshio Nuiya, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 400 days.

(21) Appl. No.: 10/835,608

(22) Filed: Apr. 28, 2004

(65) Prior Publication Data

US 2005/0003246 A1 Jan. 6, 2005

(30) Foreign Application Priority Data

Apr. 30, 2003 (JP) ............... 2003-125354

(51) Int. Cl.
*F17C 13/00* (2006.01)
(52) U.S. Cl. ............... 95/106; 96/126; 429/25; 429/34
(58) Field of Classification Search ............ 95/90, 95/96, 106, 114, 115; 96/108, 121, 126; 206/0.7; 420/900; 429/13, 25, 34
See application file for complete search history.

(56) References Cited

U.S. PATENT DOCUMENTS 4,225,320 A * 9/1980 Gell .............. 48/191

6,444,016 B1 * 9/2002 Oshima et al. ............ 96/111
6,503,299 B1 * 1/2003 Baksh et al. ............ 95/98
6,508,866 B1 * 1/2003 Golben ............ 96/146
6,627,338 B1 * 9/2003 St-Pierre et al. ............ 429/13

FOREIGN PATENT DOCUMENTS

JP 10-139401 11/1999
JP 2000-351602 A * 12/2000

* cited by examiner

*Primary Examiner*—Frank M. Lawrence
(74) *Attorney, Agent, or Firm*—Lahive & Cockfield, LLP; Anthony A. Laurentano, Esq.

(57) ABSTRACT

A hydrogen replenishing device is provided with a plurality of hydrogen storage devices which are provided with hydrogen absorbing alloys of which storage pressure are different, a reformer which supplies a hydrogen to the hydrogen storage device which is provided the hydrogen absorbing alloy of which has low storage pressure, paths for replenishing a hydrogen to the compressed hydrogen tank which serves for the hydrogen absorbing alloy which has high storage pressure to absorb the highly compressed hydrogen via the path for replenishing the hydrogen storage devices, and valves which are disposed in the paths. By doing this, it is possible to reduce an installation space for the hydrogen replenishing device which can reduce a consumed energy.

8 Claims, 4 Drawing Sheets

METHOD FOR REPLENISHING HYDROGEN TO COMPRESSED HYDROGEN TANK AND HYDROGEN REPLENISHING DEVICE

BACKGROUND OF THE INVENTION

1. Field of the Invention

The present invention relates to a method for replenishing a hydrogen to a compressed hydrogen tank and a hydrogen replenishing device.

2. Description of Related Art

For a technology for storing a hydrogen which is produced by a hydrogen producing device in an accumulator and replenishing the hydrogen from the accumulator to a hydrogen storage device in a fuel cell vehicle, for example, a hydrogen producing and replenishing device has been known which is disclosed in Japanese Unexamined Patent Application, First Publication No. Hei 10-139401.

However, if the hydrogen storage device in the fuel cell vehicle is a compressed hydrogen tank which has a high storage pressure, it is necessary to store the hydrogen in the accumulator in a higher storage pressure than that in the compressed hydrogen tank; therefore, a high output compressor is necessary which uses more electric power.

Also, a density of the hydrogen gas is not so high that the accumulator needs a large capacity; thus, a large space is necessary for installing the accumulator.

SUMMARY OF THE INVENTION

Here, an object of the present invention is to provide a method for replenishing a hydrogen to the compressed hydrogen tank and a hydrogen replenishing device which can be installed in a smaller installation space so as to be operable by a reduced energy consumption.

In order to solve the above problem, a hydrogen replenishing device of the present invention comprises a plurality of hydrogen storage devices which are provided with hydrogen absorbing alloys of which storage pressure are different from each other, a hydrogen supplying device which supplies a hydrogen to the hydrogen storage device which is provided the hydrogen absorbing alloy which has a low storage pressure among the hydrogen storage devices, a temperature controlling device which heats the hydrogen storage device which is provided with the hydrogen absorbing alloy which has a low storage pressure so as to compress the hydrogen, a tube which connects a plurality of hydrogen storage devices such that the hydrogen storage device which is provided with the hydrogen absorbing alloy which has a high storage pressure should absorb the compressed hydrogen, a path which connects the hydrogen storage devices and the compressed hydrogen tank, and a path switching device which is disposed in the tube for replenishing the compressed hydrogen tank so as to select and connect either one of the plurality of the hydrogen storage devices to the compressed hydrogen tank.

By doing this, when a hydrogen is stored in each hydrogen storage device, a hydrogen is supplied from a hydrogen supplying device to a hydrogen storage device which has a low storage pressure first, the hydrogen which is stored in the hydrogen storage device is compressed by heating the hydrogen storage device so as to be discharged next. The discharged hydrogen can be transported to a hydrogen storage device which is provided with a hydrogen absorbing alloy which has a high storage pressure. By performing the above operations consequently, it is possible to store the hydrogen in all the hydrogen storage devices. Consequently, when a hydrogen which is stored in the hydrogen storage device is replenished in the compressed hydrogen tank, the hydrogen is discharged by heating the hydrogen storage device. Also, the hydrogen storage device and the compressed hydrogen tank are connected by the path switching device; thus, it is possible to replenish the hydrogen from the hydrogen storage device to the compressed hydrogen tank. By performing the replenishment of the hydrogen to the compressed hydrogen tank such that the hydrogen is replenished to the hydrogen storage device first which has the lowest storage pressure, it is possible to replenish the hydrogen to the compressed hydrogen tank by using all the hydrogen storage devices.

Also, the hydrogen storage device is provided with a hydorogen absorbing alloy. Therefore, it is possible to use a smaller capacity for the hydrogen storage device than in a case in which a hydrogen absorbing alloy is not provided such that the hydrogen is stored in a gaseous manner.

The hydrogen replenishing device of the present invention further comprises a tank replenishment controlling device which controls the path switching device according to a residual capacity information of the compressed hydrogen tank and a replenishment time information.

By doing this, it is possible to select a hydrogen storage device which should be used for replenishing the hydrogen according to a residual capacity information of the compressed hydrogen tank or the replenishment time information. In particular, in a case in which a tank replenishment controlling device is used for controlling the path switching device according to the replenishment time information, it is possible to replenish the maximum capacity of hydrogen to the compressed hydrogen tank within a limited time for replenishment.

According to a method for replenishing a hydrogen in the present invention in which a plurality of hydrogen storage devices which are provided with a hydrogen absorbing alloys which have different storage pressures from each other are prepared, it is preferable that, in case for storing the hydrogen in the hydrogen storage devices, the hydrogen absorbing alloy which has a lower storage pressure is heated so as to compress the hydrogen which is stored in the hydrogen storage device, the compressed hydrogen is transported to the hydrogen storage device which is provided with a hydrogen absorbing alloy which has a high storage pressure. Also, it is preferable that, in case for replenishing the hydrogen which is stored in the hydrogen storage device to a compressed hydrogen tank, the hydrogen storage device which has a low storage pressure is heated so as to discharge the hydrogen, the hydrogen is replenished to the compressed hydrogen tank, the hydrogen storage device which has a high storage pressure is heated so as to discharge the hydrogen, the hydrogen is replenished to the compressed hydrogen tank.

By doing this, the hydrogen is stored in a plurality of hydrogen storage devices which have different storage pressures from each other. Therefore, it is possible to save necessary energy for compressing the hydrogen with compared to a case in which an entire amount of hydrogen are stored under a constant pressure. Also, it is possible to replenish a hydrogen to the hydrogen storage device and replenish the hydrogen to the compressed hydrogen tank by exchanging the heat between the hydrogen storage devices. Therefore, it is possible to realize an easy operation. Furthermore, it is possible to use various wasted heat for heating the hydrogen storage device. Also, the hydrogen is replenished from a plurality of hydrogen storage devices which have different storage pressure from each other to the compressed hydrogen tank; thus, it is possible to reduce a total capacity for the hydrogen storage device.

According to a method for replenishing a hydrogen to a compressed hydrogen tank in the present invention, it is preferable that a plurality of accumulators which have different storage pressures from each other are prepared, and a hydrogen which is stored in the accumulators is replenished to a compressed hydrogen tank such that the hydrogen is replenished to the accumulator first which has the lowest storage pressure such that the hydrogen is replenished to the accumulator second which has the second lowest storage pressure.

By doing this, the hydrogen is stored in a plurality of accumulators which have different storage pressure from each other; therefore, it is possible to save necessary energy for compressing the hydrogen than in a case in which the entire amount of the hydrogen is stored under a constant pressure.

According to a method for replenishing a hydrogen to a compressed hydrogen tank which is mounted on a hydrogen fuel vehicle which is provided with a plurality of accumulators which have different storage pressures from each other in the present invention, it is preferable that either one of the accumulators are selected among the plurality of the accumulators according to a stopping time information of the vehicle, and the hydrogen is replenished to the compressed hydrogen tank from the selected accumulator.

By doing this, it is possible to select the accumulator which should be used for replenishing the hydrogen according to the stopping time information of the vehicle. Therefore, it is possible to replenish the maximum capacity of hydrogen to the compressed hydrogen tank in the vehicle within a limited time for replenishment.

According to a method for replenishing a hydrogen in the present invention, it is preferable that the plurality of accumulators are provided with a plurality of hydrogen absorbing alloys which have different storage pressures from each other.

By doing this, it is possible to replenish the hydrogen to the compressed hydrogen tank only by heating the hydrogen absorbing alloy.

DETAILED DESCRIPTION OF THE INVENTION

Embodiments for a method for replenishing a hydrogen to a compressed hydrogen tank and a hydrogen replenishing device according to the present invention are explained below with reference to FIGS. 1 to 6.

Figure 1:
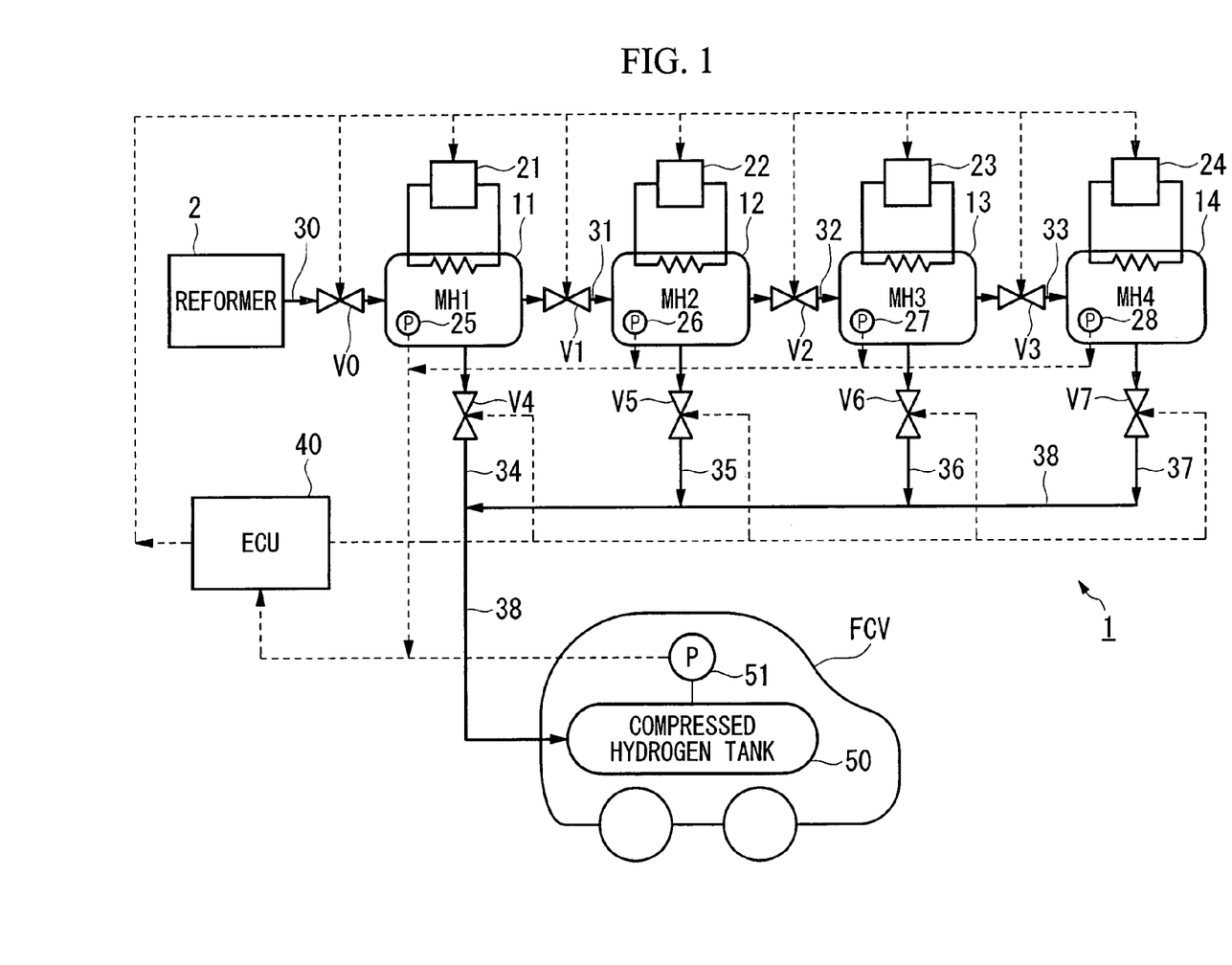
FIG. 1 is a general view for an embodiment of the hydrogen replenishing device according to the present invention.

First, a structure for the hydrogen replenishing device is explained with reference to FIG. 1. In as aspect of the present embodiment, a hydrogen replenishing device 1 is mounted in a fuel cell vehicle (hereinafter called an FCV (hydrogen fuel vehicle)) such that the hydrogen is replenished to a compressed hydrogen tank 50 which has a maximum storage pressure at 35 MPa.

The hydrogen replenishing device 1 comprises a reformer (hydrogen supplying device) 2 which produces a gaseous hydrogen from a material fuel such as a town gas and a gasoline and a plurality, such as four, hydrogen storage devices (accumulators) 11, 12, 13, and 14 which store the hydrogen which is produced in the reformer 2.

Hydrogen storage devices (accumulators) 11, 12, 13, and 14 contain hydrogen absorbing alloys MH1, MH2, MH3, and MH4 which have different temperature-pressure characteristic (hereinafter called a T-P characteristic) from each other such that the storage pressure should be different from each other. As it is known commonly, the hydrogen absorbing alloy has a tendency (T-P characteristic) in that a pressure of dissociation (counter balance pressure for discharging hydrogen) tends to increase if the temperature in the hydrogen absorbing alloy is high.

Figure 2:
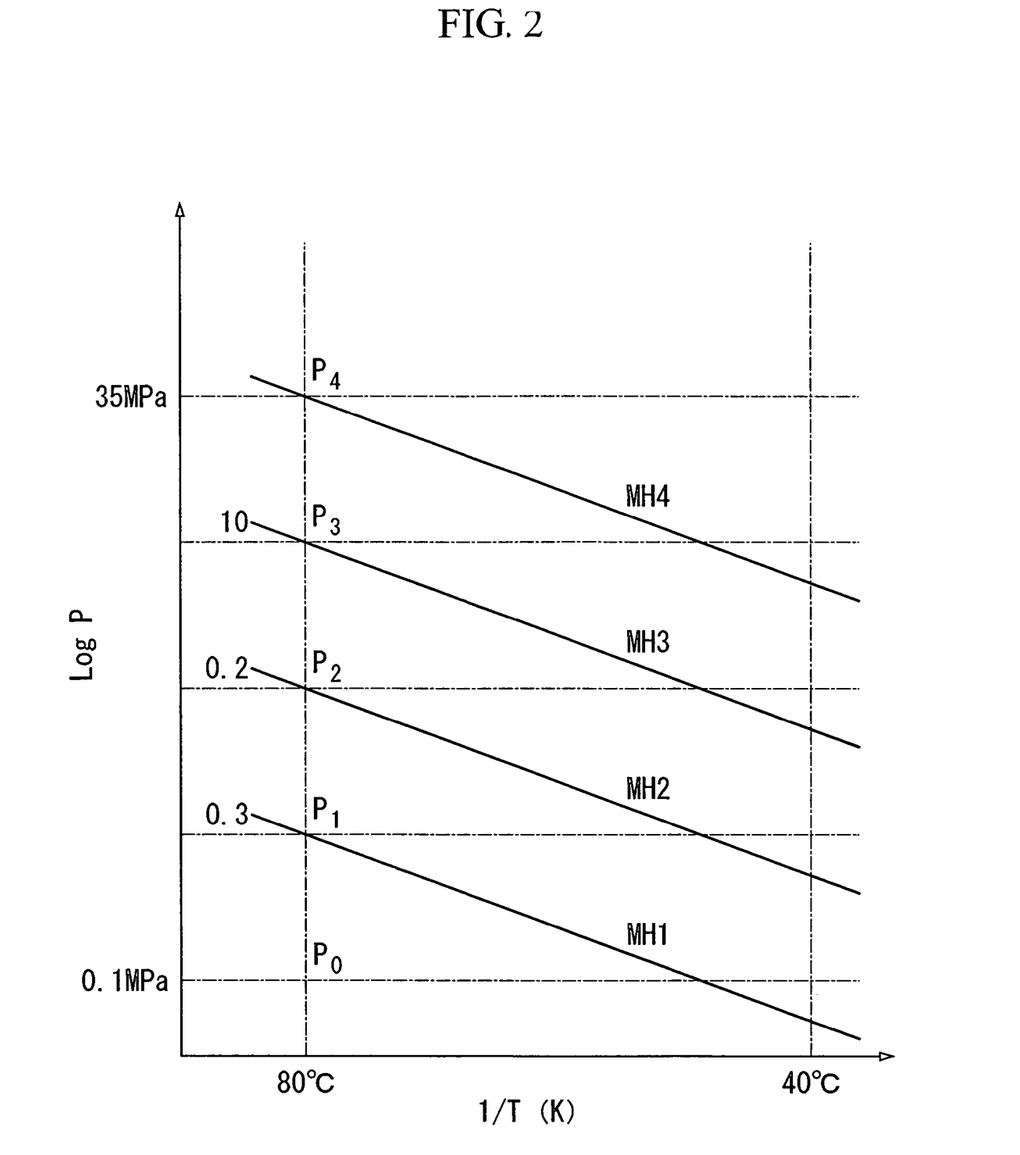
FIG. 2 is a graph showing a T-P characteristics in a hydrogen absorbing alloy which is used in a hydrogen replenishing device in the aforesaid embodiment.

FIG. 2 is a graph showing a T-P characteristics in hydrogen absorbing alloys MH1, MH2, MH3, and MH4 which are used in the present embodiment. Here, a horizontal axis indicates a reciprocal (1/T) for an absolute temperature of the hydrogen absorbing alloys. A vertical axis indicates a logarithm (log P) for the pressure of hydrogen dissociation.

The hydrogen absorbing alloy MH1 has a T-P characteristics such that the pressure of hydrogen dissociation of the hydrogen absorbing alloy MH1 which is contained in the hydrogen storage device 11 is P0 (for example, an approximate atmospheric pressure=0.1 MPa) or lower under condition that the temperature of the alloy is 40° C. and the pressure of hydrogen dissociation of the hydrogen absorbing alloy MH1 is P1 (for example, 0.3 MPa) under condition that the temperature of the alloy is 80° C.

The hydrogen absorbing alloy MH2 has a T-P characteristics such that the pressure of hydrogen dissociation of the hydrogen absorbing alloy MH2 which is contained in the hydrogen storage device 12 is P1 or lower under condition that the temperature of the alloy is 40° C. and the pressure of hydrogen dissociation of the hydrogen absorbing alloy MH2 is P2 (for example, 0.2 MPa) under condition that the temperature of the alloy is 80° C.

The hydrogen absorbing alloy MH3 has a T-P characteristics such that the pressure of hydrogen dissociation of the hydrogen absorbing alloy MH3 which is contained in the hydrogen storage device 13 is P2 or lower under condition that the temperature of the alloy is 40° C. and the pressure of hydrogen dissociation of the hydrogen absorbing alloy MH3 is P3 (for example, 10 MPa) under condition that the temperature of the alloy is 80° C.

The hydrogen absorbing alloy MH4 has a T-P characteristics such that the pressure of hydrogen dissociation of the hydrogen absorbing alloy MH4 which is contained in the hydrogen storage device 14 is P3 or lower under condition that the temperature of the alloy is 40° C. and the pressure of hydrogen dissociation of the hydrogen absorbing alloy MH4 is P4 (for example, 35 MPa) under condition that the temperature of the alloy is 80° C.

According to the T-P characteristics shown in FIG. 2, in a comparison of the pressure of hydrogen dissociation under the same condition, it is understood that the pressure of hydrogen dissociation in the hydrogen absorbing alloy MH1 is the lowest such that the pressure of hydrogen dissociation in the hydrogen absorbing alloy MH2 is the second lowest, the pressure of hydrogen dissociation in the hydrogen absorbing alloy MH3 is the second highest, and the pressure of hydrogen dissociation in the hydrogen absorbing alloy MH4 is the highest. That is, the hydrogen absorbing alloys MH1, MH2, MH3, and MH4 are selected so as to be contained in the hydrogen storage devices 11, 12, 13, and 14 such that the storage pressure is the lowest in the hydrogen storage device 11, the storage pressure is the second lowest in the hydrogen storage device 12, the storage pressure is the second highest in the hydrogen storage device 13, and the storage pressure is the highest in the hydrogen storage device 14 under the same temperature condition.

The pressure of hydrogen dissociation (to say alternately, a storage pressure) near the temperature of 80° C. in the hydrogen absorbing alloys MH1, MH2, MH3 overlap the pressure of hydrogen dissociation near the temperature of 40° C. in superior hydrogen absorbing alloys such as MH2 for MH1, MH3 for MH2, and MH4 for MH3 in a scope of alloy temperature 40° C. to 80° C. This is an indispensable condition for a hydrogen replenishment to the hydrogen storage devices 11, 12, 13, and 14.

Temperature controlling devices 21, 22, 23, and 24 are disposed in the hydrogen storage devices 11, 12, 13, and 14 for heating and cooling the hydrogen storage devices MH1, MH2, MH3, and MH4. Here, various modifications are possible for the temperature controlling devices 21 to 24. That is, it is acceptable if the temperature controlling devices 21 to 24 may heat and cool the hydrogen absorbing alloy by exchanging the heat between a thermal medium such as a hot water and a cool water. Also, it is acceptable if a heating operation is performed by an electric heater and a cooling operation is performed by using a cool wind or a heat exchanging operation between the cool water. Here, if a heat exchanger which exchanges heat by using a thermal medium is used for the temperature controlling devices 21 to 24, it is possible to use a wasted heat as a heat source which is generated in a reformer 2 etc. The operation for the temperature controlling devices 21 to 24 are controlled by an electronic controlling unit (hereinafter called ECU) 40.

Also, the hydrogen storage devices 11, 12, 13 and 14 are provided with pressure sensors 25, 26, 27, and 28 for measuring the pressure of the stored hydrogen. Output signals from the pressure sensors 25 to 28 are inputted in the ECU 40.

The reformer 2 is connected to the hydrogen storage device 11 which has the lowest storage pressure via a hydrogen supplying tube 30 which is provided with a valve V0 such that the hydrogen which is produced in the reformer 2 should be replenished in the hydrogen storage device 1. In the present embodiment, the hydrogen supplying device is formed by the reformer 2 and the hydrogen supplying tube 30.

The hydrogen storage device 11 and the hydrogen storage device 12 which has a superior storage pressure are connected via a replenishing tube 31 which is provided with a valve V1. The hydrogen storage device 12 and the hydrogen storage device 13 which has a superior storage pressure are connected via a replenishing tube 32 which is provided with a valve V2. The hydrogen storage device 13 and the hydrogen storage device 14 which has a superior storage pressure are connected via a replenishing tube 33 which is provided with a valve V3. In the present embodiment, the replenishing tubes 31 to 33 form a replenishing path for storage devices. Opening/closing operation for the valves 0 to 3 are controlled by the ECU 40 when the hydrogen is replenished to the hydrogen storage devices 11 to 14.

Also, the hydrogen storage devices 11, 12, 13, and 14 are connected to a replenishing tube 38 via replenishing tubes 34, 35, 36, and 37 which are provided with valves V4, V5, V6, and V7. The replenishing tube 38 is connectable to a compressed hydrogen tank 50 in a vehicle FCV via connectors which are not shown in the drawings. Opening/closing operation for the valves V4 to V7 is controlled by the ECU 40 when the hydrogen is replenished to the compressed hydrogen tank 50. In the present embodiment, the replenishing tubes 34 to 38 form a path for replenishing tank. The valves V4 to V7 form a path switching device which can select and connect either one of the four hydrogen storage devices 11 to 14 to the compressed hydrogen tank 50.

Also, if the replenishing tube 38 is connected to the compressed hydrogen tank 50 via the connectors, a pressure sensor 51 which measures a pressure in the compressed hydrogen tank 50 is connected to the ECU 40 automatically; thus, an output signal for the pressure sensor 51 is inputted in the ECU 40. Here, the higher the pressure in the compressed hydrogen tank 50 is, the more hydrogen remains in the compressed hydrogen tank 50; therefore, it is understood that the pressure in the compressed hydrogen tank 50 may be an information which indicates the residual amount of the hydrogen in the compressed hydrogen tank 50.

Next, a method for replenishing the hydrogen in the hydrogen storage devices 11 to 14 in the hydrogen replenishing device 1 is explained. The hydrogen is replenished to the hydrogen storage devices 11 to 14 in a way such that the hydrogen absorbing alloys MH1 to MH3 which are contained in the hydrogen storage devices 11 to 13 respectively are used for compressors, the hydrogen which is stored in the hydrogen storage device which has a lower storage pressures is compressed; thus, the hydrogen is transported to the hydrogen storage device which has a higher storage pressures consequently.

To explain in detail, at first in order to replenish the hydrogen in the hydrogen storage device 11, the valve V1 is closed. The temperature of the hydrogen absorbing alloy MH1 in the hydrogen storage device 11 is maintained at lower than 40° C. and the pressure of hydrogen dissociation of the hydrogen absorbing alloy MH1 is maintained at lower than P0 (atmospheric pressure). In such a case, the temperature controlling device 21 is operated according to necessity so as to cool the hydrogen absorbing alloy MH1. Consequently, the valve V0 is opened; thus, the hydrogen is supplied from the reformer 2 to the hydrogen storage device 11 while maintaining the temperature of the hydrogen absorbing alloy MH1 at lower than 40° C.

Consequently, if the hydrogen storage device 11 is filled with the hydrogen and it is not possible to replenish the hydrogen from the reformer 2 to the hydrogen storage device 11, the temperature of the hydrogen absorbing alloy MH2 in the hydrogen storage device 12 is maintained at lower than 40° C. by closing the valves V0 and V2. Thus, the pressure of hydrogen dissociation of the hydrogen absorbing alloy MH2 is P1 or lower. In such a case, the temperature controlling device 22 is operated according to necessity so as to cool the hydrogen absorbing alloy MH2. After that, the valve V1 is opened so as to communicate between the hydrogen storage device 11 and the hydrogen storage device 12 via the replenishing tube 31. The temperature controlling device 21 in the hydrogen storage device 11 is operated so as to heat the hydrogen absorbing alloy MH1 and maintain the temperature of the hydrogen absorbing alloy MH1 at 80° C. By doing this, the pressure of the hydrogen which is stored in the hydrogen absorbing alloy 11 is compressed at P1; thus, the hydrogen of which pressure is P1 stored in the hydrogen storage device 11 is absorbed in the hydrogen absorbing alloy MH2 in the hydrogen storage device 12. By doing this, it is possible to transport the hydrogen in the hydrogen storage device 11 to the hydrogen storage device 12.

Consequently, when the hydrogen storage device 12 is filled with the hydrogen and it is not possible to transport the hydrogen from the hydrogen storage device 11 to the hydrogen storage device 12, the valves V1 and V3 are closed. The temperature of the hydrogen absorbing alloy MH3 in the hydrogen storage device 13 is maintained at lower than 40° C.; thus, the pressure of hydrogen dissociation of the hydrogen absorbing alloy MH3 is P2 or lower. In such a case, the temperature controlling device 23 is operated according to necessity so as to cool the hydrogen absorbing alloy MH3. After that, the valve V2 is opened so as to communicate between the hydrogen storage device 12 and the hydrogen storage device 13 via the replenishing tube 32. The temperature controlling device 22 in the hydrogen storage device 12 is operated so as to heat and maintain the temperature of the hydrogen absorbing alloy MH2 at 80° C. By doing this, the hydrogen which is stored in the hydrogen storage device 12 is compressed at pressure P2; thus, the hydrogen which has a pressure P2 stored in the hydrogen storage device 12 is absorbed in the hydrogen absorbing alloy MH3 in the hydrogen storage device 13. By doing this, it is possible to transport the hydrogen in the hydrogen storage device 12 to the hydrogen storage device 13.

If the hydrogen storage device 13 is filled with the hydrogen and it is not possible to transport the hydrogen from the hydrogen storage device 12 to the hydrogen storage device 13, the valve V2 is closed. The temperature of the hydrogen absorbing alloy MH4 in the hydrogen storage device 14 is maintained at lower than 40° C. Thus, the pressure of hydrogen dissociation of the hydrogen absorbing alloy MH4 is P3 or lower. In such a case, the temperature controlling device 24 is operated according to necessity so as to cool the hydrogen absorbing alloy MH4. After that, the valve V3 is opened so as to communicate between the hydrogen storage device 13 and the hydrogen storage device 14 via the replenishing tube 33. The temperature controlling device 23 in the hydrogen storage device 13 is operated so as to heat the hydrogen absorbing alloy MH3 and maintain the temperature of the hydrogen absorbing alloy MH3 at 80° C. By doing this, the pressure of the hydrogen which is stored in the hydrogen absorbing alloy 13 is compressed at P3; thus, the hydrogen of which pressure is P3 stored in the hydrogen storage device 13 is absorbed in the hydrogen absorbing alloy MH4 in the hydrogen storage device 14. By doing this, it is possible to transport the hydrogen in the hydrogen storage device 13 to the hydrogen storage device 14.

If the hydrogen storage device 14 is filled with the hydrogen and it is not possible to transport the hydrogen from the hydrogen storage device 13 to the hydrogen storage device 14, the valve V3 is closed.

Next, a method for replenishing the hydrogen to the compressed hydrogen tank 50 in a vehicle FCV is explained. If a similar hydrogen absorbing alloy is used for the hydrogen absorbing alloys MH1 to MH4, necessary amount for the hydrogen absorbing alloy is approximately equal under condition that the amount of the hydrogen which is supposed to be absorbed is equal.

Figure 5:
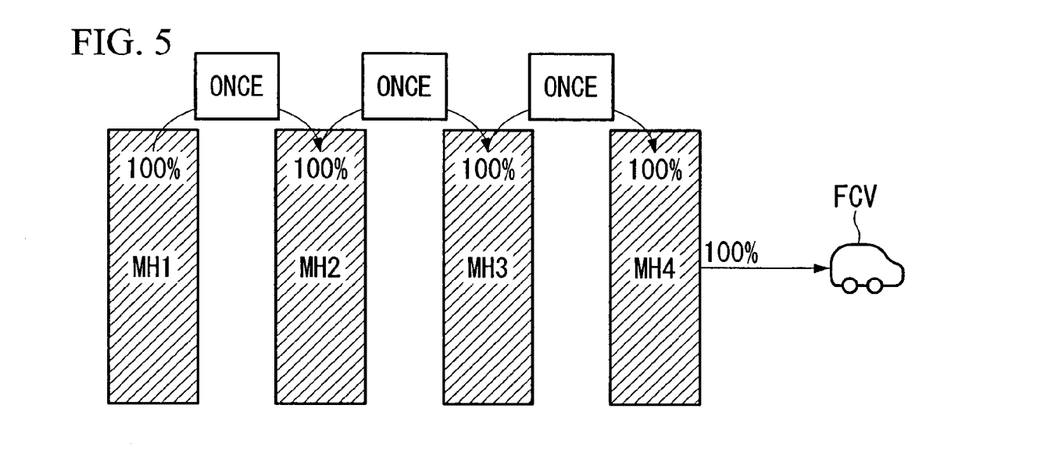
FIG. 5 is a view for explaining a comparative example for a capacity ratio in the hydrogen replenishing devices.

Therefore, if an entire storage capacity for the hydrogen storage devices 11 to 14 is equal to the storage capacity for the compressed hydrogen tank 50, the hydrogen can be transported in a single transportation from the hydrogen storage device which has a lower storage pressure to the hydrogen storage device which has a higher storage pressure respectively as shown in FIG. 5. Also, an empty compressed hydrogen tank 50 can be replenished to a full capacity only by transporting an entire amount of the hydrogen which is stored in the hydrogen storage device 14 to the compressed hydrogen tank 50 in a single transportation operation. However, in such a case, a total amount for the hydrogen absorbing alloys MH1 to MH4 increases; thus, a total capacity for the hydrogen storage devices 11 to 14 increase accordingly. As a result, it is inevitable to cause not only an increase in the production cost but also larger installation space for the hydrogen replenishing device 1. Also, if the more amount of the hydrogen absorbing alloys MH1 to MH4 is used, a thermal load in the temperature controlling devices 21, 22 increase; therefore, larger capacity is necessary; thus, the size of the hydrogen replenishing device 1 may increase undesirably.

Here, in the hydrogen replenishing device 1 in the present embodiment, the hydrogen is replenished from all of the hydrogen storage devices 11 to 14 to the compressed hydrogen tank 50 basically from downsizing, lighter-weight, and cost-saving point of views for the hydrogen replenishing device 1.

Here, a method for replenishing the hydrogen to the hydrogen storage devices 12 and 13 is similar to the method for replenishing the hydrogen to the hydrogen storage device 14 which is explained above. That is, after the replenishment of the hydrogen to the hydrogen storage device 14 is completed, the hydrogen is replenished to the hydrogen storage device 13 via the hydrogen storage devices 11 and 12. After the replenishment of the hydrogen to the hydrogen storage device 13 is completed, the hydrogen is replenished to the hydrogen storage device 12 via the hydrogen storage device 11.

In order to replenish the hydrogen from all of the hydrogen storage devices 11 to 14 to the compressed hydrogen tank 50, it is certain that the hydrogen should be replenished to the compressed hydrogen tank 50 from the hydrogen storage device which has a lower storage pressure first such that the hydrogen storage device which has a higher storage pressures should supply the hydrogen later.

Consequently, if an entire hydrogen which is stored in the hydrogen storage devices 11, 12, 13, and 14 is replenished to an empty compressed hydrogen tank 50 of which inner pressure is an atmospheric pressure such that the hydrogen is replenished from the hydrogen storage device which has a lower storage pressures first and the hydrogen storage device which has a higher storage pressures replenished the hydrogen later, a capacity ratio for the hydrogen storage devices 11 to 14 is determined according to the storage pressure (that is, a pressure for replenishing hydrogen to the compressed hydrogen tank 50) in the hydrogen storage devices 11 to 14.

For example, if the storage pressure P1 in the hydrogen storage device 11 is 0.3 MPa, the storage pressure P2 in the hydrogen storage device 12 is 2 MPa, the storage pressure P3 in the hydrogen storage device 13 is 10 MPa, and the storage pressure P4 in the hydrogen storage device 14 is 35 MPa, a hydrogen storage amount of the hydrogen storage device 11 is theoretically approximately 0.1%, a hydrogen storage amount of the hydrogen storage device 12 is theoretically approximately 7.4%, a hydrogen storage amount of the hydrogen storage device 13 is theoretically approximately 25.0%, and a hydrogen storage amount of the hydrogen storage device 14 is theoretically approximately 67.5% with reference to 100% of the hydrogen storage amount in a full compressed hydrogen tank 50.

Figure 6:
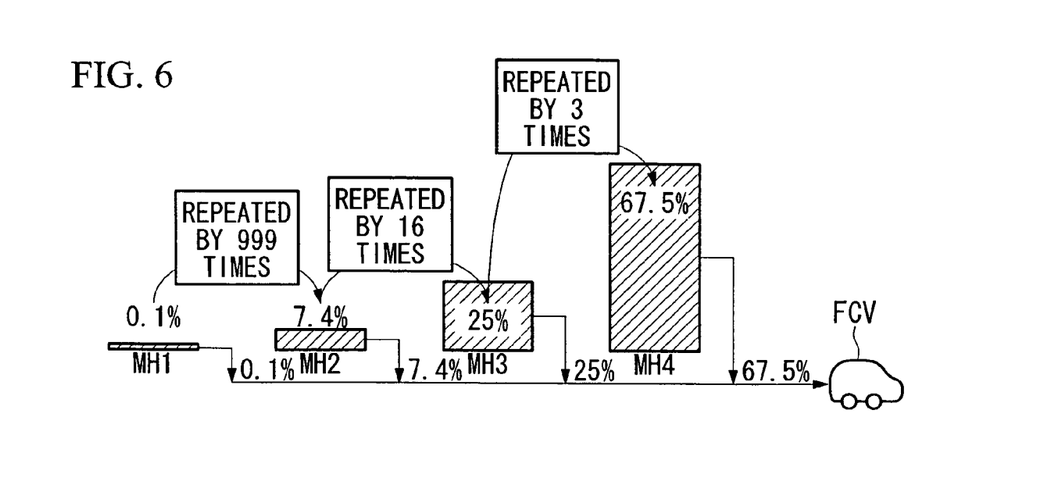
FIG. 6 is a view for explaining a comparative example for a capacity ratio in the hydrogen replenishing devices.

If the capacity ratio for the hydrogen storage devices 11 to 14 is set according to the capacity for the hydrogen storage, it is possible to minimize a total volume for the hydrogen storage devices 11 to 14; thus, effects for downsizing, light-weight, and reducing a production cost are great. However, in such a case, as shown in FIG. 6, when the hydrogen is replenished to the hydrogen storage devices 11 to 14 in advance to the replenishment of the hydrogen to the compressed hydrogen tank 50, the replenishment of the hydrogen from the hydrogen storage device 13 to the hydrogen storage device 14 must be repeated three times so as to replenish the hydrogen to the hydrogen storage device. Therefore, in order to replenish the hydrogen to the hydrogen storage devices 13 and 14, the replenishment of the hydrogen from the hydrogen storage device 12 to the hydrogen storage device 13 must be repeated sixteen times. That is, in order to replenish the hydrogen to the hydrogen storage devices 12, 13 and 14, the hydrogen must be transported from the hydrogen storage device 11 to the hydrogen storage device 12 nine hundred and ninety-nine times; thus, the hydrogen must be transported to the hydrogen storage devices 11 to 14 not only very frequently but also for a longer time.

Figure 4:
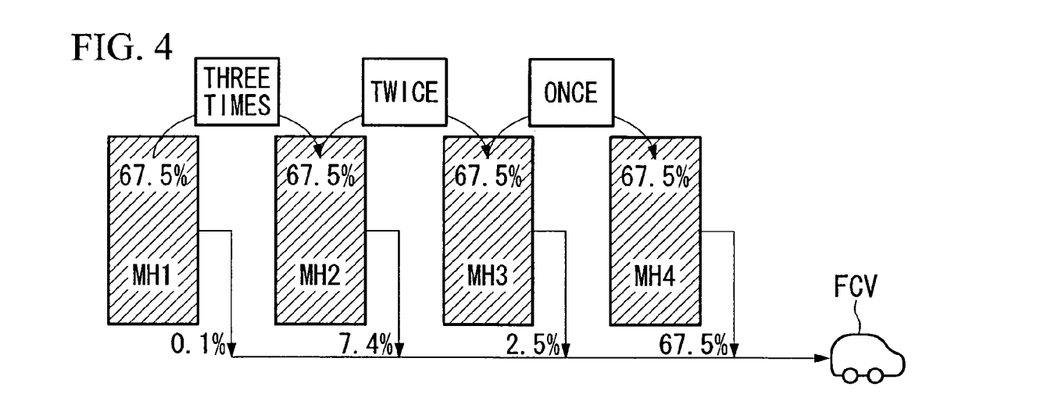
FIG. 4 is a view for explaining a capacity ratio in the hydrogen storage devices in the aforesaid embodiment.

Here, in the present embodiment, as shown in FIG. 4, capacity for the hydrogen storage devices 11 to 14 are equal to each other. Also, a storage capacity for the hydrogen is set to 67.5% with reference to 100% of storage capacity for the hydrogen in the compressed hydrogen tank 50. By doing this, the hydrogen is transported from the hydrogen storage device 13 to the hydrogen storage device 14 in a singe transportation operation for replenishing the hydrogen in the hydrogen storage device 14. The hydrogen is transported from the hydrogen storage device 12 to the hydrogen storage device 13 in two transportation operations for replenishing the hydrogen in the hydrogen storage devices 13 and 14. Thus, the hydrogen is transported from the hydrogen storage device 11 to the hydrogen storage device 12 in three transportation operations for replenishing the hydrogen in the hydrogen storage device 12, 13 and 14. By doing this, it is possible to realize an efficiency from downsizing, light-weight, and cost saving point of views and adequacy for operability and operation time compatibly.

Next, a controlling operation for the replenishment of the hydrogen to the compressed hydrogen tank 50 in a vehicle FCV in the present embodiment is explained with reference to a flow chart shown in FIG. 3.

Figure 3:
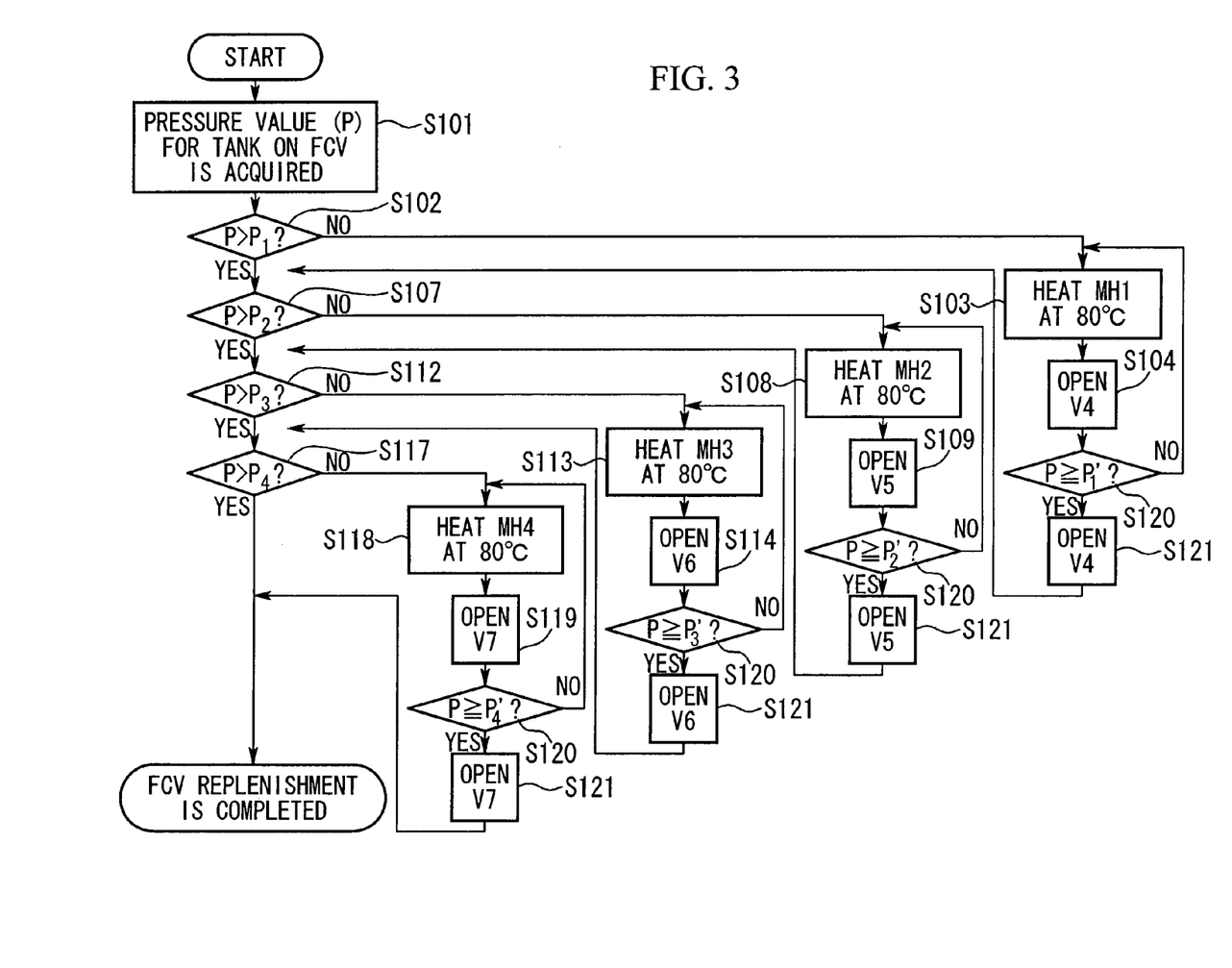
FIG. 3 is a flow chart for a controlling operation of the hydrogen replenishment to the compressed hydrogen tank by using the hydrogen replenishing device according to the aforesaid embodiment.

Here, in advance to perform a controlling routine which is shown in FIG. 3, conditions are set that a hydrogen is filled in all of the hydrogen storage devices 11 to 14 at an alloy temperature of 40° C. or lower in advance. Also, it is conditioned that the all of the valves V0 to V7 are closed.

First, in a step S101, a pressure P in the compressed hydrogen tank 50 in the vehicle FCV which is measured by a pressure sensor 51 is read out.

Next, forwarding to as step S102, it is determined whether or not the pressure P in the compressed hydrogen tank 50 is greater than a pressure P1 of hydrogen dissociation for the hydrogen absorbing alloy MH1 in the hydrogen storage device 11 at a temperature of 80° C.

If the result in the step S102 indicates "NO" (P≦P1), it is possible to replenish the hydrogen from the hydrogen storage device 11 to the compressed hydrogen tank 50. Therefore, the routine forwards to a step S103. On the other hand, if the result in the Step S102 indicates "YES" (P>P1), it is not possible to replenish the hydrogen from the hydrogen storage device 11 to the hydrogen storage device 12; thus, the routine forwards to a step S107.

In a step S103, the temperature controlling device 21 in the hydrogen storage device 11 is operated so as to heat the hydrogen absorbing alloy MH1 at 80° C. and the hydrogen which is stored in the hydrogen storage device 11 is compressed at P1.

Next, the routine forwards to a step S104 from the step S103. Here, the valve V4 is opened; thus, the replenishment of the hydrogen from the hydrogen storage device 11 to the compressed hydrogen tank 50 is started.

Consequently, the routine forwards from the step S104 to a step S105. Here, it is determined whether or not the pressure P in the compressed hydrogen tank 50 which is measured by the pressure sensor 51 is greater than an actual pressure P1' in the hydrogen storage device 11 under condition that the actual pressure P1' is measured by a pressure sensor 25 temporarily. While the actual pressure P1' in the hydrogen storage device 11 is greater than the pressure P in the compressed hydrogen tank 50, it is possible to replenish the hydrogen from the hydrogen storage device 11 to the compressed hydrogen tank 50. Therefore, if a result in the step S105 indicates "NO" (P<P1'), the routine returns to the step S103; thus, the replenishment of the hydrogen from the hydrogen storage device 11 is continued. If the result of the measurement in the step S105 indicates "YES" (P≧P1'), it is not possible to replenish the hydrogen to the compressed hydrogen tank 50 from the hydrogen storage device 11. Thus, the routine forwards to the step S106 in which the valve V4 is closed so as to complete the replenishment of the hydrogen from the hydrogen storage device 11. Consequently, the routine forwards to a step S107.

In the step S107, it is determined that the pressure P in the compressed hydrogen tank 50 under condition that the pressure P is measured by a pressure sensor 51 is greater than the pressure of hydrogen dissociation P2 in the hydrogen absorbing alloy MH2 in the hydrogen storage device at 80° C.

If the result of the measurement in the step S107 indicates "NO" (P≦P2), it is possible to replenish the hydrogen to the compressed hydrogen tank 50 from the hydrogen storage device 12. Thus, the routine forwards to the step S108. If the result of the measurement in the step S107 indicates "YES" (P>P2), it is not possible to replenish the hydrogen to the compressed hydrogen tank 50 from the hydrogen storage device 12. Thus, the routine forwards to the step S112.

In the step S108, the temperature controlling device 22 in the hydrogen storage device 12 is operated so as to heat the hydrogen absorbing alloy MH2 at 80° C. and the hydrogen which is stored in the hydrogen storage device 12 is compressed at the pressure P2.

Next, the routine forwards from the step S108 to a step S109 in which a valve V5 is opened so as to start replenishing the hydrogen from the hydrogen storage device 12 to the compressed hydrogen tank 50.

Consequently, the routine forwards from the step S109 to a step S110 in which it is determined whether or not the pressure P in the compressed hydrogen tank 50 under condition that the pressure P is measured by the pressure sensor 51 is greater than an actual pressure P2' in the hydrogen storage device 12 under condition that the pressure P2' is measured by a pressure sensor 26. While the actual pressure P2' in the hydrogen storage device 12 is greater than the pressure P in the compressed hydrogen tank 50, it is possible to replenish the hydrogen from the hydrogen storage device 12 to the compressed hydrogen tank 50. Therefore, if a result in the step S110 indicates "NO" (P<P2'), the routine returns to the step S108; thus, the replenishment of the hydrogen from the hydrogen storage device 12 is continued. If the result of the measurement in the step S110 indicates "YES" (P≧P2'), it is not possible to replenish the hydrogen to the compressed hydrogen tank 50 from the hydrogen storage device 12. Thus, the routine forwards to the step S1116 in which the valve V5 is closed so as to complete the replenishment of the hydrogen from the hydrogen storage device 12. Consequently, the routine forwards to a step S112.

In the step S112, it is determined whether or not the pressure P in the compressed hydrogen tank 50 under condition that the pressure P is measured by the pressure sensor 51 is greater than a pressure P3 of hydrogen dissociation in the hydrogen absorbing alloy MH3 in the hydrogen storage device 13 at 80° C.

If a result of the determination in the step S112 indicates "NO" (P≦P3), it is possible to replenish the hydrogen from the hydrogen storage device 13 to the compressed hydrogen tank 50; thus, the routine forwards to a step S113. On the other hand, if a result of the determination in the step S112 indicates "YES" (P>P3), it is not possible to replenish the hydrogen from the hydrogen storage device 13 to the compressed hydrogen tank 50; thus, the routine forwards to a step S117.

In the step S113, the temperature controlling device 23 in the hydrogen storage device 13 is operated so as to heat the hydrogen absorbing alloy MH3 at 80° C. and the hydrogen which is stored in the hydrogen storage device 13 is compressed at the pressure P3.

Next, the routine forwards from the step S113 to a step S114 in which a valve V6 is opened so as to start replenishing the hydrogen from the hydrogen storage device 13 to the compressed hydrogen tank 50.

Consequently, the routine forwards from the step S1114 to a step S1115 in which it is determined whether or not the pressure P in the compressed hydrogen tank 50 under condition that the pressure P is measured by the pressure sensor 51 is greater than an actual pressure P3' in the hydrogen storage device 13 under condition that the pressure P3' is measured by a pressure sensor 27. While the actual pressure P3' in the hydrogen storage device 13 is greater than the pressure P in the compressed hydrogen tank 50, it is possible to replenish the hydrogen from the hydrogen storage device 13 to the compressed hydrogen tank 50. Therefore, if a result in the step S115 indicates "NO" (P<P3'), the routine returns to the step S113; thus, the replenishment of the hydrogen from the hydrogen storage device 13 is continued. If the result of the measurement in the step S115 indicates "YES" (P≧P3'), it is not possible to replenish the hydrogen to the compressed hydrogen tank 50 from the hydrogen storage device 13. Thus, the routine forwards to the step S116 in which the valve V6 is closed so as to complete the replenishment of the hydrogen from the hydrogen storage device 13. Consequently, the routine forwards to a step S117.

In the step S117, it is determined whether or not the pressure P in the compressed hydrogen tank 50 under condition that the pressure P is measured by the pressure sensor 51 is greater than a pressure P4 of hydrogen dissociation in the hydrogen absorbing alloy MH4 in the hydrogen storage device 14 at 80° C.

If a result of the determination in the step S117 indicates "NO" (P≦P4), it is possible to replenish the hydrogen from the hydrogen storage device 14 to the compressed hydrogen tank 50; thus, the routine forwards to a step S118. On the other hand, if a result of the determination in the step S117 indicates "YES" (P>P4), it is not possible to replenish the hydrogen from the hydrogen storage device 14 to the compressed hydrogen tank 50; thus, the routine is temporarily completed.

In the step S1118, a temperature controlling device 24 in the hydrogen storage device 14 is operated so as to heat the hydrogen absorbing alloy MH4 at 80° C. and the hydrogen which is stored in the hydrogen storage device 14 is compressed at a pressure P4.

Next, the routine forwards from the step S118 to a step S119 in which a valve V7 is opened so as to start replenishing the hydrogen from the hydrogen storage device 14 to the compressed hydrogen tank 50.

Consequently, the routine forwards from the step S119 to a step S120 in which it is determined whether or not the pressure P in the compressed hydrogen tank 50 under condition that the pressure P is measured by the pressure sensor 51 is greater than an actual pressure P4' in the hydrogen storage device 14 under condition that the pressure P4' is measured by a pressure sensor 28. While the actual pressure P4' in the hydrogen storage device 14 is greater than the pressure P in the compressed hydrogen tank 50, it is possible to replenish the hydrogen from the hydrogen storage device 14 to the compressed hydrogen tank 50. Therefore, if a result in the step S120 indicates "NO" (P<P4'), the routine returns to the step S118; thus, the replenishment of the hydrogen from the hydrogen storage device 14 is continued. If the result of the measurement in the step S120 indicates "YES" (P>P4'), it is not possible to replenish the hydrogen to the compressed hydrogen tank 50 from the hydrogen storage device 14 because the compressed hydrogen tank 50 is filled. Thus, the routine forwards to a step 121 in which the valve V7 is closed so as to complete the replenishment of the hydrogen from the hydrogen storage device 14. Thus, the routine is temporarily completed.

By controlling the replenishment of the hydrogen to an almost empty compressed hydrogen tank 50, the hydrogen is replenished from the hydrogen storage device 11 first which has the lowest storage pressures to the compressed hydrogen tank 50 such that the hydrogen is replenished later from the hydrogen storage devices 12, 13, and 14 which have higher storage pressures consequently. Therefore, the hydrogen is replenished from all of the hydrogen storage devices 11 to 14 to the compressed hydrogen tank 50; thus, the compressed hydrogen tank 50 is filled.

In contrast, in a case in which the replenishment of the hydrogen is started under condition that a hydrogen remains in the compressed hydrogen tank 50 and the pressure P in the compressed hydrogen tank 50 is greater than the pressure P1 of hydrogen dissociation of the hydrogen absorbing alloy MH1 at 80° C. and smaller than the pressure P2 of hydrogen dissociation of the hydrogen absorbing alloy MH2 at 80° C., the hydrogen is not replenished from the hydrogen storage device 11. Instead, the replenishment of the hydrogen is started from the hydrogen storage device 12. Similarly, if pressure P in the compressed hydrogen tank 50 is greater than the pressure P2 of hydrogen dissociation of the hydrogen absorbing alloy MH2 at 80° C. and smaller than the pressure P3 of hydrogen dissociation of the hydrogen absorbing alloy MH3 at 80° C., the hydrogen is not replenished from the hydrogen storage devices 11 and 12. Instead, the replenishment of the hydrogen is started from the hydrogen storage device 13. Furthermore, if pressure P in the compressed hydrogen tank 50 is greater than the pressure P3 of hydrogen dissociation of the hydrogen absorbing alloy MH3 at 80° C. and smaller than the pressure P4 of hydrogen dissociation of the hydrogen absorbing alloy MH4 at 80° C., the hydrogen is not replenished from the hydrogen storage devices 11, 12, and 13. Instead, the replenishment of the hydrogen is started from the hydrogen storage device 14.

That is, the pressure in the compressed hydrogen tank 50 indicates an information for a residual capacity for the compressed hydrogen tank 50; therefore, the hydrogen storage device to which the hydrogen is supposed to be replenished first is selected by the ECU 40 according to the information of a residual capacity for the compressed hydrogen tank 50. The valves V4 to V7 and the temperature controlling devices 21 to 24 are controlled accordingly; thus the hydrogen is replenished from the hydrogen storage device which has a higher storage pressure than that in the compressed hydrogen tank 50 to the compressed hydrogen tank 50. In the present embodiment, the ECU 40 forms a controlling device for controlling the replenishment of the tank by which the valves V4 to V7 and the temperature controlling devices 21 to 24 are controlled according to the information of a residual capacity for the compressed hydrogen tank 50.

As explained above, according to a hydrogen replenishing device 1 and a method for replenishing the hydrogen according to the present embodiment, the hydrogen storage devices 1 to 14 are provided with the hydrogen absorbing alloys MH1 to MH4. Therefore, it is possible to reduce capacities in the hydrogen storage devices 11 to 14 with compared to a case in which a hydrogen is stored in a gaseous manner under condition that the hydrogen absorbing alloy is not provided. As a result, it is possible to realize a downsizing and light-weight effect for the hydrogen replenishing device 1 with a reduced installation space.

Also, it is possible to reduce more energy which is necessary for compression because the hydrogen is stored in a plurality of hydrogen storage devices 11 to 14 which have different storage pressures than in a case in which an entire hydrogen is stored under a constant pressure condition.

Also, it is possible to replenish the hydrogen to the hydrogen storage devices 11 to 14 and the compressed hydrogen tank 50 only by exchanging a heat among the hydrogen storage devices 11 to 14. Thus, an easy operation can be realized.

Also, it is possible to reduce a total capacity for the hydrogen storage devices 11 to 14 as explained above because the hydrogen is replenished from a plurality of hydrogen storage devices 11 to 14 which have different storage pressures to the compressed hydrogen tank 50.

By the way, as explained above, in a method for replenishing the hydrogen to the compressed hydrogen tank 50 from all of the hydrogen storage devices 11 to 14 in an order such as the hydrogen storage device 11 supplies the hydrogen first, the hydrogen storage device 14 supplies the hydrogen last, it takes a long time for replenishing the hydrogen fully. Therefore, such a method is suitable for a case in which a vehicle FCV is stopping for a long time.

However, there is not always a sufficient time for stopping the vehicle FCV whenever it is necessary to replenish the hydrogen to the compressed hydrogen tank 50. It may occur that only a fewer amount of hydrogen can be replenished to the compressed hydrogen tank 50 within a limited time during which the vehicle FCV is stopping if a time for stopping the vehicle FCV is short and the compressed hydrogen tank 50 is in almost empty condition (that is, the pressure in the compressed hydrogen tank 50 is P1 or lower) and the hydrogen is replenished to the compressed hydrogen tank 50 from the hydrogen storage device (for example, the hydrogen storage device 11 or 12) which has the lowest storage pressure. In such a case, it is possible to replenish more hydrogen to the compressed hydrogen tank 50 in a shorter time if the replenishment of the hydrogen from the hydrogen storage device (for example, the hydrogen storage device 11 or 12) which has a lower storage pressure is cancelled and the hydrogen storage device (for example, a hydrogen storage device 13 or 14) which has a higher storage pressure replenishes the hydrogen first.

For such a case, it is acceptable if it is possible to select or set an anticipated time for stopping the vehicle FCV or a desirable replenishment time in the ECU 49 when the replenishment of the hydrogen to the compressed hydrogen tank 50 starts such that the hydrogen storage device to which the hydrogen is supposed to be replenished first is selected by the ECU 40 and control the valves V4 to V7 and the temperature controlling devices 21 to 24 according to the information for the stopping time and a replenishment time which are set or selected. By controlling this way, it is possible to replenish a maximum amount of hydrogen to the compressed hydrogen tank 50 in a limited time. In such a case, the ECU 40 forms a controlling device for controlling the replenishment of the tank by which the valves V4 to V7 and the temperature controlling devices 21 to 24 are controlled according to the information for a stopping time of the vehicle FCV and the information for the replenishment time and selecting the hydrogen storage device to which the hydrogen is supposed to be replenished first.

In the above explained embodiment, explanations are made for a hydrogen replenishing device which is provided with a hydrogen storage device in which hydrogen absorbing alloys are contained. However, it is acceptable if the hydrogen storage device may be an accumulator which stores the hydrogen in a gaseous manner without using a hydrogen absorbing alloy.

In such a case, a plurality of accumulators which have different storage pressures from each other are prepared such that the hydrogen is replenished to the accumulator first which has the lowest storage pressure when the hydrogen which is stored in the accumulators is replenished to the compressed hydrogen tank. After that, the hydrogen is replenished from the accumulator which has a higher storage pressure than the first accumulator. By doing this, it is possible to reduce more energy which is necessary for compression because the hydrogen is stored in a plurality of accumulators which have different storage pressures than in a case in which an entire hydrogen is stored under a constant pressure condition.

Also, in such a case, it is possible to replenish the hydrogen to the compressed hydrogen tank from the accumulator first which has a higher storage pressure than the storage pressure in the compressed hydrogen tank.

Furthermore, also in such a case, it is possible to realize a controlling operation in which the ECU selects either one of a plurality of the accumulators according to the information for the stopping time of the vehicle so as to replenish the hydrogen from the selected accumulator to the compressed hydrogen tank when the hydrogen is replenished to the compressed hydrogen tank which is mounted in a fuel cell vehicle. By doing this, it is possible to select the accumulator to which the hydrogen is supposed to be replenished according to the information for the stopping time of the vehicle. Therefore, it is possible to replenish the maximum capacity of hydrogen to the compressed hydrogen tank within a limited time for stopping the vehicle.

Other Embodiments

Here, the present invention is not limited only to the above explained embodiments.

In the above explained embodiments, explanations are made for a case in which the hydrogen replenishing device is provided with four hydrogen storage devices. However, more importantly, it is acceptable if there are two, three, five, or more pieces of hydrogen storage devices provided therein.

Also, in the above explained embodiments, conditions are set such that the temperature of the hydrogen at the replenishment to the hydrogen storage device is set to be 400° C. and the temperature of the hydrogen when the hydrogen is discharged form the hydrogen storage device is set to be 80° C. However, the temperature for the alloy is not limited only to these temperatures when the hydrogen is replenished and discharged. That is, it is possible to set the temperature of the alloy by taking the T-P characteristics of the hydrogen storage device which is supposed to be used and an operability for the replenishment of the hydrogen into account.

Also, with respect to the capacity ratio of the hydrogen storage device, it is not always necessary to set the capacity for all of the hydrogen storage devices at the same capacity. That is, it is possible to set a preferable capacity ratio by taking an operability for the replenishment of the hydrogen to the hydrogen storage device and an installation space in the hydrogen replenishing device 1 into account.

Also, the hydrogen fuel vehicle on which a compressed hydrogen tank is mounted is not limited to a fuel cell vehicle. That is, it is acceptable if a hydrogen engine vehicle is used which is provided with an engine which uses a hydrogen for a fuel.

Also, it is acceptable if the compressed hydrogen tank which is mounted in the hydrogen fuel vehicle is provided with a hydrogen absorbing alloy thereinside.

Furthermore, it is acceptable if the compressed hydrogen tank is mounted in a transporting apparatus other than a vehicle. Alternatively, it is acceptable if the compressed hydrogen tank is a transportable compressed hydrogen tank.

As explained above, according to the present invention, it is possible to replenish the hydrogen to all the hydrogen storage devices successively; thus, it is possible to replenish the hydrogen from the hydrogen storage device in which a hydrogen is replenished to the compressed hydrogen tank. Also, the hydrogen storage device is provided with a hydrogen absorbing alloy; therefore, it is possible to reduce capacities in the hydrogen storage devices with compared to a case in which a hydrogen is stored in a gaseous manner under condition that the hydrogen absorbing alloy is not provided. Also, it is possible to reduce the size of the hydrogen replenishing device which can be used in a reduced installation space.

According to the present invention, it is possible to select the hydrogen storage device which is supposed to be used for replenishing the hydrogen according to the information for the residual capacity for the compressed hydrogen tank or the information for the replenishing time. Therefore, it is possible to improve the operability. In particular, if a controlling device for the replenishment for the tank is used for controlling the path switching device according to the information for the replenishing time, it is possible to replenish the maximum capacity of hydrogen to the compressed hydrogen tank in a limited time.

According to the present invention, the hydrogen is stored in a plurality of hydrogen storage devices which have different storage pressures; thus, it is possible to reduce more energy which is necessary for compression than in a case in which the entire hydrogen is stored under a constant pressure condition. Also, it is possible to replenish the hydrogen to the hydrogen storage device and the compressed hydrogen tank only by exchanging a heat among the hydrogen storage devices. Thus, it is possible to realize an easy operation. Furthermore, it is possible to use various waste heat for heating the hydrogen storage devices. Also, the hydrogen is replenished from a plurality of hydrogen storage devices which have different storage pressures to the compressed hydrogen tank; therefore, it is possible to reduce the total capacity for the hydrogen storage devices.

According to the present invention, the hydrogen is stored in a plurality of accumulators which have different storage pressures; therefore, it is possible to save more energy which is necessary for compression than in a case in which the entire hydrogen is stored under a constant pressure condition.

According to the present invention, it is possible to select the accumulator which is supposed to be used for the replenishment according to the information for the stopping time of the vehicle. Therefore, it is possible to replenish the maximum capacity of hydrogen to the compressed hydrogen tank in the vehicle in a limited stopping time.

According to the present invention, it is possible to replenish the hydrogen to the compressed hydrogen tank only by heating the hydrogen absorbing alloy.

What is claimed is:

1. A hydrogen replenishing device comprising:
   a plurality of hydrogen storage devices each of which are provided with hydrogen absorbing alloys and each of which have a storage pressure different from each other;
   a hydrogen supplying device which supplies hydrogen to at least one of said plurality of hydrogen storage devices having a low storage pressure;
   a temperature controlling device which heats the hydrogen storage device having the low storage pressure so as to compress the hydrogen;
   a tube which connects one or more of said plurality of hydrogen storage devices such that the hydrogen storage device which is provided with the hydrogen absorbing alloy which has a high storage pressure should absorb the compressed hydrogen;
   a path which connects the plurality of hydrogen storage devices and a compressed hydrogen tank; and
   a path switching device which is disposed in the tube for replenishing the compressed hydrogen tank so as to select and connect at least one of the plurality of hydrogen storage devices to the compressed hydrogen tank.

2. A hydrogen replenishing device according to claim 1, further comprising a tank replenishment controlling device which controls the path switching device according to a residual capacity information of the compressed hydrogen tank and a replenishment time information.

3. A method for replenishing hydrogen wherein a plurality of hydrogen storage devices which are provided with a hydrogen absorbing alloys which have different storage pressures from each other are provided:
   at the time of storing the hydrogen in the hydrogen storage devices, the hydrogen absorbing alloy which has a lower storage pressure is heated so as to compress the hydrogen which is stored in the hydrogen storage device, the compressed hydrogen is transported to a hydrogen storage device which is provided with a hydrogen absorbing alloy which has a high storage pressure; and at the time of replenishing the hydrogen which is stored in the hydrogen storage device to a compressed hydrogen tank, the hydrogen storage device which has a low storage pressure is heated so as to discharge the hydrogen, wherein the hydrogen is replenished to the compressed hydrogen tank, and then the hydrogen storage device which has a high storage pressure is heated so as to discharge the hydrogen, wherein the hydrogen is replenished to the compressed hydrogen tank.

4. A method for replenishing hydrogen to a compressed hydrogen tank, comprising:

providing a plurality of accumulators which have different storage pressures from each other;

replenishing the hydrogen stored in the accumulators to a compressed hydrogen tank such that the hydrogen is first replenished to the accumulator which has the lowest storage pressure and is then replenished to the accumulator which has the second lowest storage pressure.

5. A method for replenishing hydrogen to a compressed hydrogen tank which is mounted on a hydrogen fuel vehicle from a plurality of accumulators which have different storage pressures from each other, comprising:

selecting one of the plurality of accumulators according to a stopping time information of the vehicle; and replenishing the hydrogen to the compressed hydrogen tank from the selected accumulator.

6. A method for replenishing a hydrogen according to claim 5, wherein the plurality of accumulators are provided with a plurality of hydrogen absorbing alloys which have different storage pressures from each other.

7. A method for replenishing hydrogen to a plurality of hydrogen storage devices which are provided with hydrogen absorbing alloys which have different storage pressures from each other, comprising the steps of:

compressing the hydrogen by heating the hydrogen absorbing alloy which has a low storage pressure;

discharging the compressed hydrogen; and transporting the discharged hydrogen to the hydrogen storage device which is provided with the hydrogen absorbing alloy which has a high storage pressure.

8. A method for replenishing hydrogen to a compressed hydrogen tank from one or more hydrogen storage devices comprising the sequential steps of:

heating a hydrogen storage device which has a low storage pressure;

discharging the hydrogen from the hydrogen storage device which has a low storage pressure and replenishing the hydrogen to the compressed hydrogen tank;

heating the hydrogen from a hydrogen storage device which has a high storage pressure; and discharging the hydrogen from the hydrogen storage device which has a high storage pressure, and replenishing the hydrogen to the compressed hydrogen tank.

* * * * *